United States Patent [19]
Oberg

[11] 3,798,911
[45] Mar. 26, 1974

[54] FLOATABLE BOOM STRUCTURE
[75] Inventor: Per Olog Oberg, Sollentuna, Sweden
[73] Assignee: Sanera Projecting Aktiebolag, Bromma, Sweden
[22] Filed: Mar. 31, 1971
[21] Appl. No.: 129,932

[30] Foreign Application Priority Data
Apr. 2, 1970 Sweden.............................. 4568/70
Aug. 4, 1970 Sweden............................ 10704/70
Jan. 27, 1971 Sweden................................ 979/71

[52] U.S. Cl......................................... 61/1 F, 61/5
[51] Int. Cl............................................ E02b 15/04
[58] Field of Search....... 61/1 F; 138/108, 118, 119, 138/178; 285/260; 210/242, DIG. 21

[56] References Cited
UNITED STATES PATENTS
| | | | |
|---|---|---|---|
| 3,608,316 | 9/1971 | Manuel................... | 61/1 F |
| 3,343,567 | 9/1967 | Mulligan et al..................... | 138/119 |
| 3,364,632 | 1/1968 | Isaac............................. | 138/119 X |
| 3,495,286 | 2/1970 | Harper........................... | 138/118 X |
| 3,563,036 | 2/1971 | Smith et al.............................. | 61/1 |

*Primary Examiner*—Mervin Stein
*Assistant Examiner*—David H. Corbin
*Attorney, Agent, or Firm*—Woodhams, Blanchard & Flynn

[57] ABSTRACT

A floatable boom structure and a method of manufacturing same. The boom structure includes a plurality of elongated sections which can be interconnected to permit formation of a boom structure of selected length. Each boom section includes an elongated bouyant member provided with internal partitions for dividing same into a plurality of isolated bouyant compartments. The bouyant member, and the compartments contained therein, can be filled with air to provide the boom with the desired bouyancy. A weighted curtain is secured to the bouyant member for suspension into the water. The bouyant member can be collapsed to permit compact storage of the boom sections. Resilient expander devices are disposed within the bouyant member for permitting expansion or collapsing of same.

11 Claims, 15 Drawing Figures

INVENTOR
PER OLOF OBERG

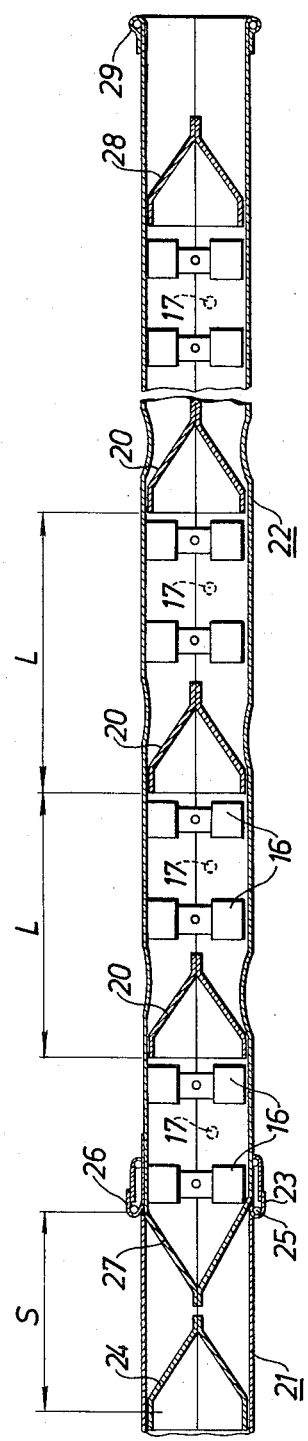

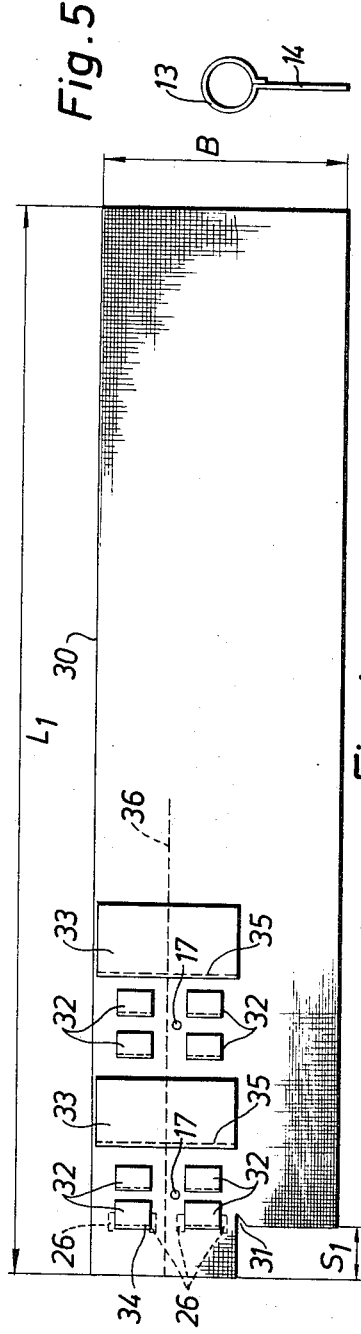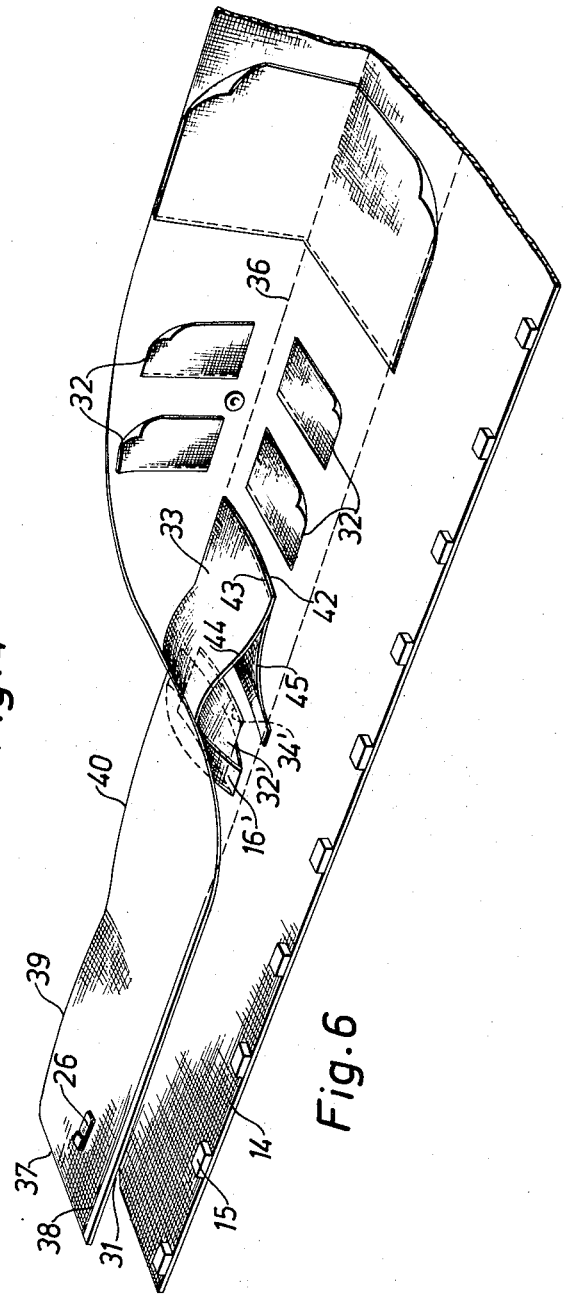

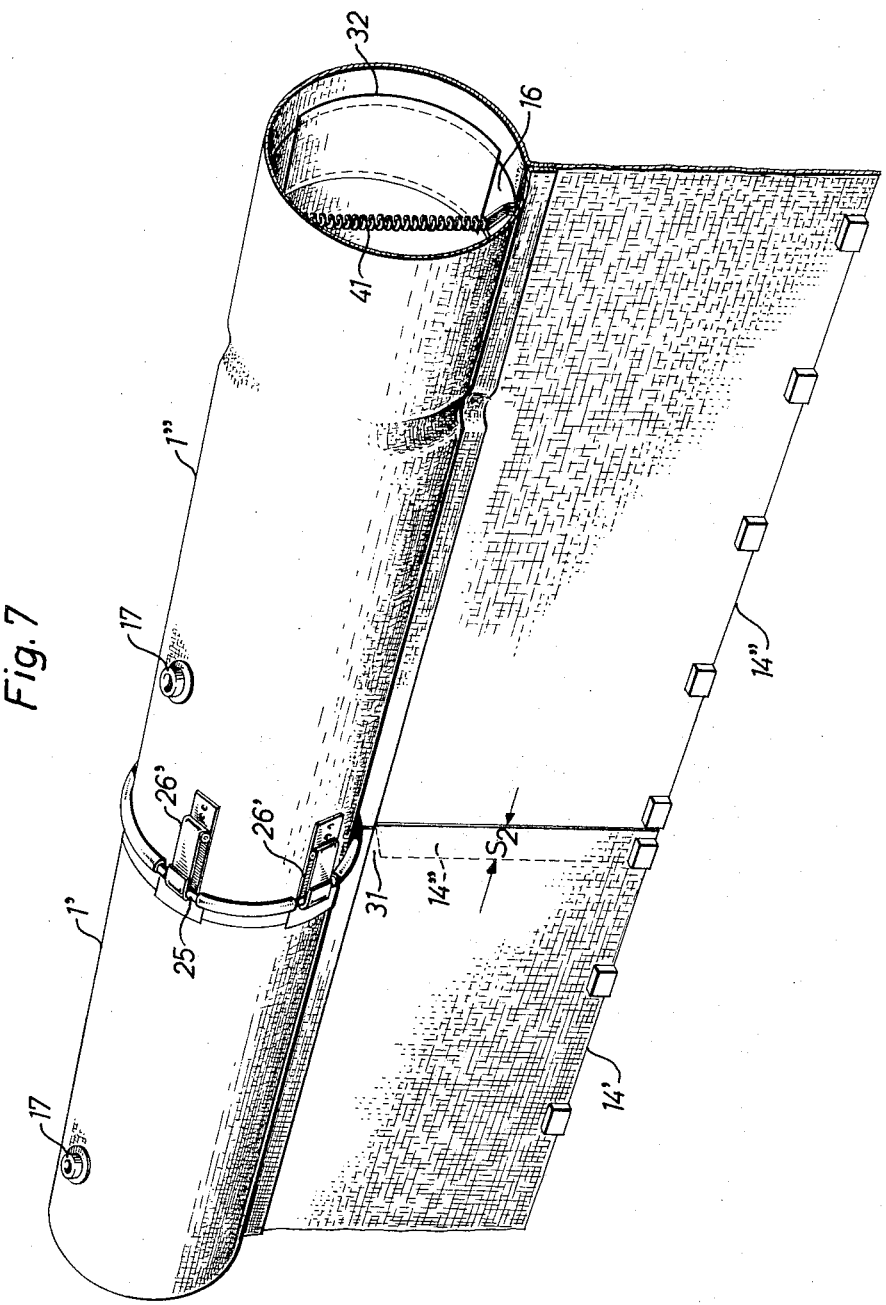

INVENTOR
PER OLOF OBERG
BY
Woodhams, Blanchard and Flynn
ATTORNEYS

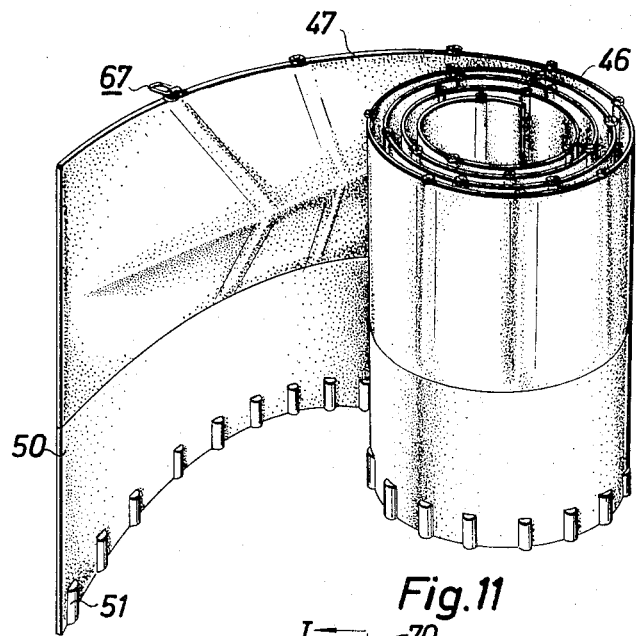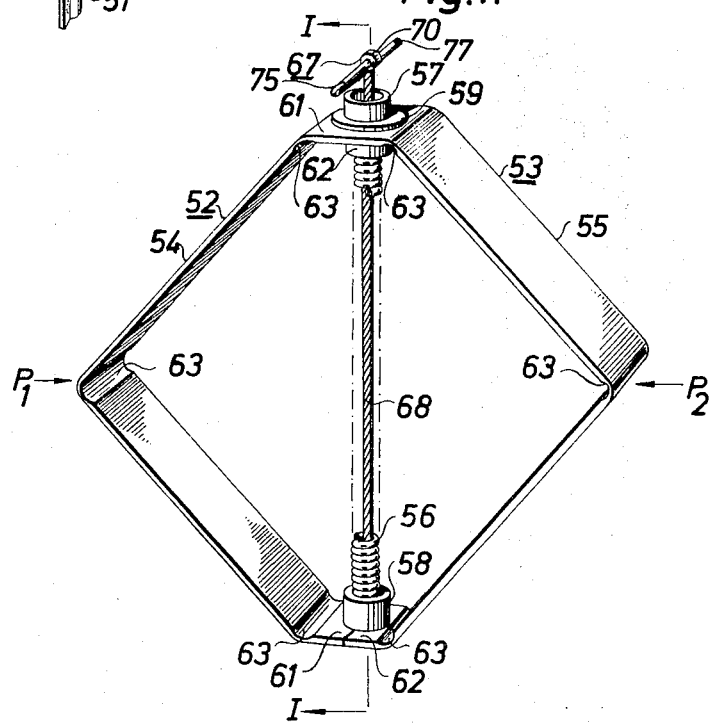

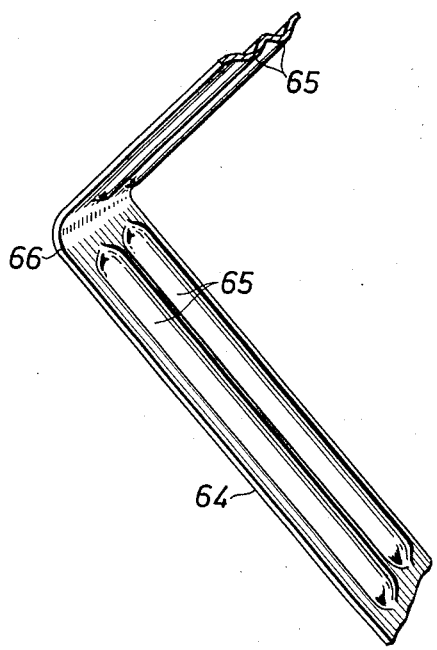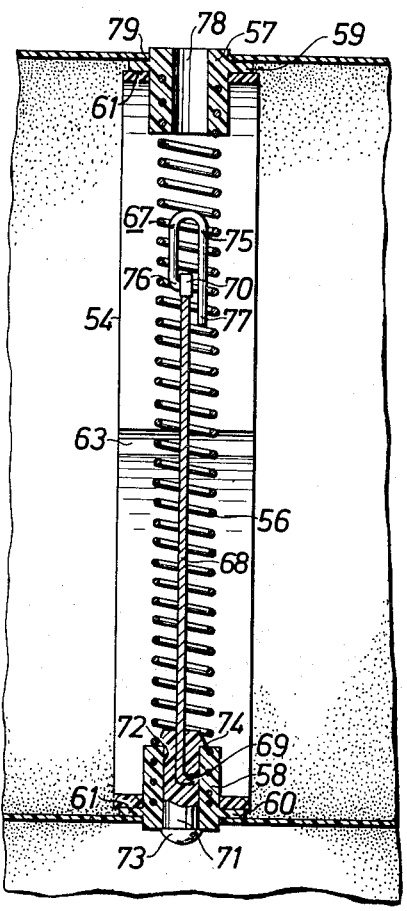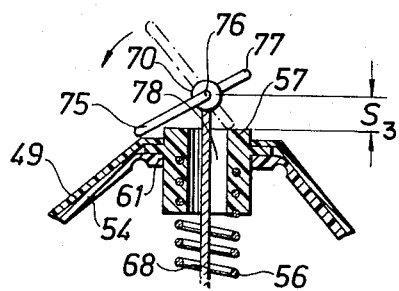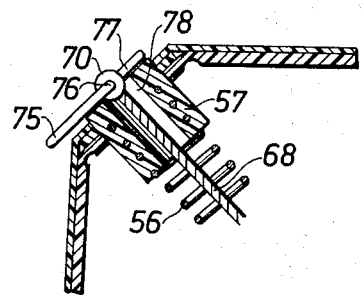

FLOATABLE BOOM STRUCTURE

The present invention refers to a boom and a method of manufacturing the same.

Harmful impurities floating on the surface of water must be screened-off and neutralized as quickly as possible. This is particularly true for oil slicks resulting from the intentional or unintentional release of oil from oil carrying ships. The most expedient device for screening-off oil slicks is the boom. A modern boom construction consists of one or more buoyant bodies, which hold the boom afloat on the surface of the water. Depending from the buoyant bodies down to a specific, suitable depth below the surface of the water is a curtain which is firmly connected to the buoyant bodies and which is provided at its bottom with weights to ensure that the curtain constantly occupies a substantially vertical position in the water.

The area of water surface impurified by the release of oil is often very wide for example such an area may be several kilometers in length and width. In order to impede and contain an oil belt of this magnitude, one or more chains of booms are required, the boom chains of necessity having great length and consisting of a large number of booms of some 25 meters in length. This means that it must be possible to lay out and connect up the booms in a quick and simple manner. The individual booms should be so constructed that when it is desired to lay the booms out they can be released from their stowed condition rapidly and easily. It should also be possible to lay out the booms from a boat or a helicopter. Moreover, it should be possible, either while placing the booms in position or immediately afterwards, to connect the booms together to form a continuous, sufficiently long chain of booms in a simple and positive manner. The boom chain can then be towed and manouvered to enclose the oil belt in a closed ring of booms, whereafter the oil can be rendered harmless or moved to a suitable site for destruction.

The disadvantage with booms hitherto known to the art is that they are either very bulky, making it difficult to store and stow the same, or also require special working operations when laying them out on the surface of the water. This latter disadvantage is related to the manner in which the booms are floated in the water. In order to hold the booms buoyant, different types of floats are used for example balls or inflated cushions of a plastics material for example, attached to the boom, or there may be attached to the boom a hose which is inflated with a special inflating medium when the boom is layed out, and emptied of the inflating medium when the boom, after having been in use, is rolled up or folded. The arrangement of balls or cushions requires a large storage space, while the hose arrangement requires special working operation to be effected when laying out the booms.

The object of the present invention is to circumvent these disadvantages and the invention relates to the type of boom which includes buoyant bodies which are given their shape by the expansion of collapsable cavities, and is mainly characterized in that each cavity includes one or more expander means.

It is of particular importance that the boom is constructed so that in practice it can automatically and rapidly expand in direct connection with the laying out of the boom, and that the expanded boom can be coupled reliably and simply to a similar boom. In view of the increasing urgency for the care and protection of environment, the need of booms will probably be great and it is of the utmost importance that large series of booms can be manufactured in an efficient manner. The booms at present available do not fulfil all of the requirements placed thereon and it is a further object of the invention to provide a boom manufacturing method which fulfills all necessary requirements.

An embodiment of a boom according to the invention will now be described with reference to the accompanying drawings.

FIG. 3 is a horizontal sectional view of a portion of a boom and illustrates how two booms constructed according to the invention are coupled together.

FIG. 4 is a horizontal view of a pre-worked length of material for use in constructing the boom of the invention.

FIG. 5 illustrates in section and in principle how the length of material illustrated in FIG. 4 is formed into a boom.

FIG. 6 illustrates the different working operations performed when forming the boom of the invention.

FIG. 7 illustrates in perspective a coupling effected between two booms constructed in accordance with the invention.

FIG. 10 illustrates in perspective coiling of the boom shown in FIG. 8 and 9.

FIG. 11 illustrates in perspective an expander means according to the invention, intended to be attached in the wall of a buoyant body of the boom of FIG. 8, the expander means being illustrated in its extended condition.

FIG. 12 illustrates in perspective an alternative embodiment of a frame member of the expander means of FIG. 11.

FIG. 13 is a section taken throught the line I—I in FIG. 11 of the expander means in a compressed condition i.e. non-extended condition.

FIG. 14 and 15 illustrate in section different positions for a latching member of one embodiment of a latching means according to the invention.

Figure 1:
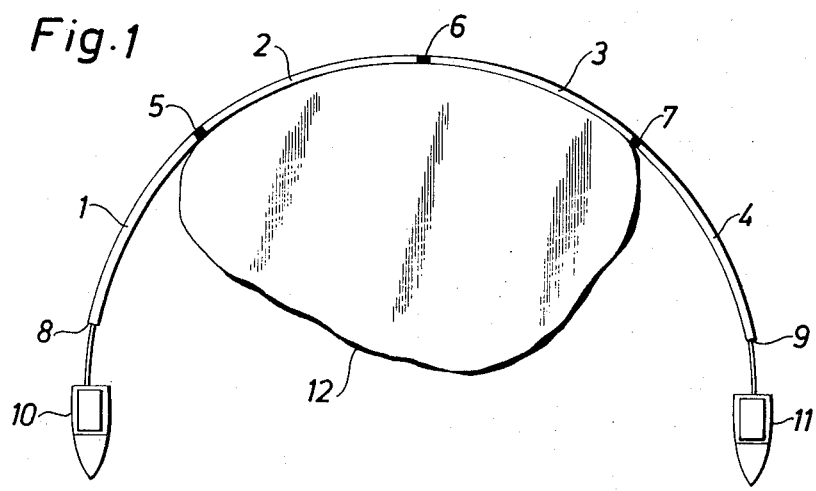
FIG. 1 illustrates a train of booms being towed by two boats while enclosing a small oil slick.

Illustrated in FIG. 1 are four booms 1–4 coupled together at their ends at positions 5–7 and being towed by their free ends 8 and 9 by two boats 10 and 11. The reference numeral 12 indicates an oil slick which is to be enclosed and rendered harmless.

Figure 2:
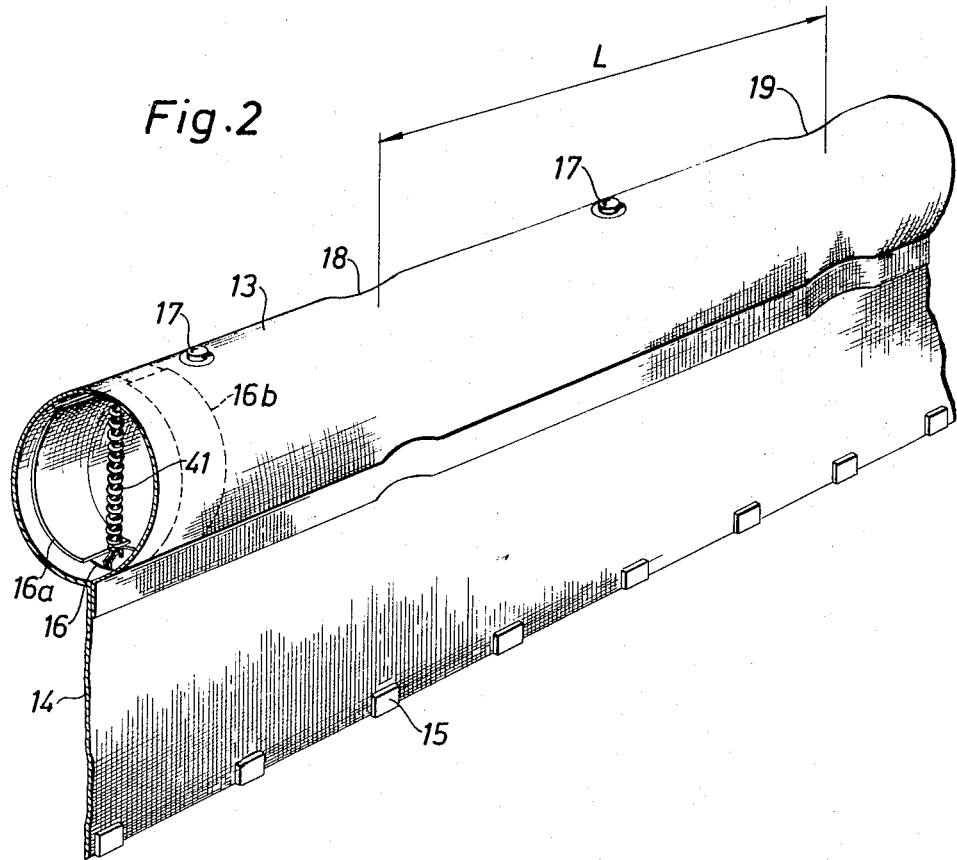
FIG. 2 is a perspective view of a portion of a boom according to the invention.

FIG. 2 illustrates a portion of a boom having an upper, substantially cylindrical buoyant body in the form of a hose 13 and a depending curtain 14 fixedly attached to the hose 13. The curtain 14 is provided at the bottom edge thereof with weights 15 to ensure that the curtain constantly adopts a substantially vertical attitude in the water. Arranged in appropriate spaced apart relationship within the hose 13 are expander means 16, which consist of two resilient-ly, flexible platelike stirrup members 16a and 16b which have their opposite ends connected by a tension spring 41 which actuates said stirrup members so that said opposite ends are pulled toward one another causing the members 16a and 16b to assume a somewhat semicylindrical shape for causing expansion of the hose. Valve means 17 are arranged substantially on the upper side of the hose 13 to permit air to be introduced to inflate the hose and to release the air when the boom is rolled-up or folded after use. The valve means 17 are of the type which permit air to pass therethrough but which prevent water from penetrating the interior of the hose.

The reference numerals 18 and 19 in FIG. 2 indicate depressions in the hose 13. The depressions 18 and 19 are correlated with the method for manufacturing the boom and with the fact that the hose according to the invention is divided into sections, each of which has a length L and forms a divided portion of the hose 13 as shown in FIG. 2. The division of a boom hose into connected sections which, with respect to the inner volume of the hose, are completely separated from each other, is necessary from the point of view of the necessary buoyancy of the boom. For example, if the boom hose was constructed of one continuous section and became damaged or punctured the hose is liable to become full of water and sink. Damage to one or more sections of a boom constructed in accordance with the present invention will have no great effect on the efficiency of the boom, and a relatively large number of sections may be damaged without rendering the boom completely unserviceable.

FIG. 3 further illustrates the division of the boom hose into sections L. The partitions arranged between the sections are in the form of pockets 20 which are airtight connected to the wall of the hose 13 in a manner hereinafter described. The reference numeral 21 in FIG. 3 indicates generally a first boom which is coupled to a second boom 22 through a coupling joint 23. The joint 23 is created by passing the hose of boom 21 over the end pocket 24 through a distance S and is terminated with a rope 25 attached to the mouth of the hose and passing around the same, while a snaphook means 26 is fastened to the left end (FIG. 3) of the boom 22 in a manner whereby the extended portion of the hose of boom 21 extends slightly over the boom 22. This method of coupling two booms together is illustrated more clearly in FIG. 7.

The aforementioned expander means for radially extending the boom hose are indicated by the reference numeral 16 in FIG. 3. Two such expander means have been shown for each section. A suitable position for the air valves 17 in each section has been shown with dotted circles in FIG. 3. The left end section of the boom 22, i.e. the end provided with the snap-hook means 26, has an end pocket 27 which is suitably directed in the opposite direction to the remaining pockets 20. On the other hand, the right end pocket 28 of the boom 22 is directed in the same direction as the remaining pockets 20 and, similarly to the boom 21, this end of the boom 22 is provided with an extension S which is terminated with a rope ferrule 29 for connecting the boom to a third boom in the manner previously described.

The method for manufacturing the boom of the invention is illustrated in FIGS. 4–6. FIG. 4 illustrates a sheet 30 of the material from which the hose and curtain of the boom are made. The sheet 30 consists of a water-tight and air-tight material, for example a plastics or rubber cloth, plastics or rubber impregnated fabric or the like. The total length L1 is equal to the length of the boom, for example 25 meters, and the width B of the sheet 30 corresponds to the total distance required to form both the hose 13 and the curtain 14 (FIG. 5). A rectangular portion having a width S1 has been clipped out of the left side of the portion of the sheet 30 forming the curtain 14 and a recess 31 has been made, for reasons hereinafter desclosed.

The first working step to be made on the pre-formed sheet 30 is to attach the valves 17, or suitable valve holder means, in the sheet. The valves or valve holders can be attached by sewing adhesion or heat sealing, as can all subsequent component attaching operations. It is important, however, that the attach-ment joints are water-tight and air-tight. Attachment pockets 32 intended as attachment means for the expander means 16, are then secured to the sheet 30 in a similar way, together with cloth pieces 33 intended to form sealing pockets for the different sections of the boom. The attachment flaps 32 and the cloth pieces 33 are only attached along their left edge surfaces, i.e. along seams 34 and 35 and at positions on the sheet 30 which correspond to the final positions for the expander means 16 and the pockets 20. The snap-hook means 26 are attached to the outside of the left end of the sheet of material 30.

Subsequent to attaching the components 32, 33 and 26, that portion of the upper part of the sheet 30 which is to form the hose 13 is folded around its centre line 36 so that the folded portions lie flat against each other. The boom hose is then finally assembled by joining together the end edge portions 37 and simultaneously forming a small part of a longitudinal seam or joint 38. The expander means 16 are then placed in position and fixed by means of the attachment flaps 32 while the longitudinal seam or joint 38 is successively formed from left to right as seen in FIG. 6. In FIG. 6 a first completed section of the hose is indicated by the reference numeral 39, to the left of the Figure, while the section being assembled is indicated by the reference numeral 40. Construction of the hose continues in stages, the attachment flaps 32 and the cloth pieces 33 being successively placed in position prior to the longitudinal seam 38 being formed. FIG. 6 illustrates by way of example how an expander means 16' is placed between two attachment flaps 32', of which only one is shown in the Figure. The previously free edge surfaces of the attachment flaps 32' are then joined to the sheet of material 30 so as to secure the expander means 16' in the hose in a manner whereby the expander means is permitted some degree of movement therein. The expander means 16' may include a tension spring 41, FIGS. 2 and 7. The spring 41 is disengaged from the expander means 16' when placing the expander means in position, and is then reconnected with the expander means to extend the hose as indicated to the left of FIG. 6.

Each pocket 20 (FIG. 3) is formed by a cloth piece 33 as illustrated in FIG. 6. A double folded edge 42 obtained with the cloth-piece 33 subsequent to folding the sheet of material 30 is then joined along a join line 43, whereafter folding of the length of material 30 is continued together with the forming of the longitudinal seam joint 38. Two previously free edges 44 and 45 of the clothpiece 33 then become clamped between parts of the folded legth of material 30 and sealingly joined thereto.

Subsequent to the complete hose having been stepwise but continuously joined together in the aforementioned manner the rope ferrule 25 is then placed on the right side of the hose, as seen in the drawing, and the weights 15 attached to the bottom edge of the boom curtain 14.

FIG. 7 illustrates how two booms are joined together and shows the rope ferrule 25 at the right end of a boom 1', as seen in the drawing, and two spring-hook means 26' at the left end of a second boom 1''. It is important that the curtains 14' and 14'' of the two booms at the position where they are joined is impermeable to oil. Consequently, the curtains 14'' and 14' are made to overlap each other through a distance S2, this distance being obtained through the aforementioned construction of the curtain portion according to FIG. 4 and by the fact that the right end of the boom 1' is passed over the left end of the boom 1'' to such an extent that the rope ferrule 25 passes into the recess 31 on the curtain 14'' of the left boom 1''.

The spring-hook means 26, 26' (FIGS. 3, 4, 7) can be in the form of a self-locking quick coupling of known type which enables two booms to be connected and disconnected in a simple and easy manner.

The manufacturing method according to the invention enables the booms to be produced in a simple, expedient and inexpensive manner and a boom constructed in accordance with the method of the invention can be layed out rapidly, automatically expanded and coupled to similar booms in a simple and effective manner, to form long boom chains which build an effective enclosure against oil or other impurities. Moreover, a boom constructed in accordance with the invention can be simply and quickly rolled-up or folded into a small volume for packaging or storage in a position of readiness.

For the purpose of towing a chain of booms constructed in accordance with the invention, the towing means can be simply attached to the rope ferrule 25 and the hooking means 26. A chain of booms according to the invention can be connected up to form a complete enclosing ring by attaching the rope ferrule 25 at one free end of the boom chain to the hook means 26 at the other free end of the chain. By suitably modifying the sheet of material 30 when producing the same, it is possible to exclude the recesses 18 and 19 illustrated in FIG. 2.

Booms of large dimensions intended to be used at sea or for more comprehensive decontamination work in open water can, in rough weather be subjected to high wind and wave pressures, which cause the buoyant bodies to be unfavourably deformed. Under such conditions, the bodies are flattened by the wind and waves and pressed down against the surface of the water, thereby reducing the intended screening effect of the boom and also its buoyancy. Deformation and flattening of the hose may occur while the booms are being towed to ring an oil slick, allowing some of the enclosed oil to be blown or thrown by the wind and wave movement over the buoyant bodies. The escaped oil must then be collected and screened-off in a new boom enclosure.

Figure 8:
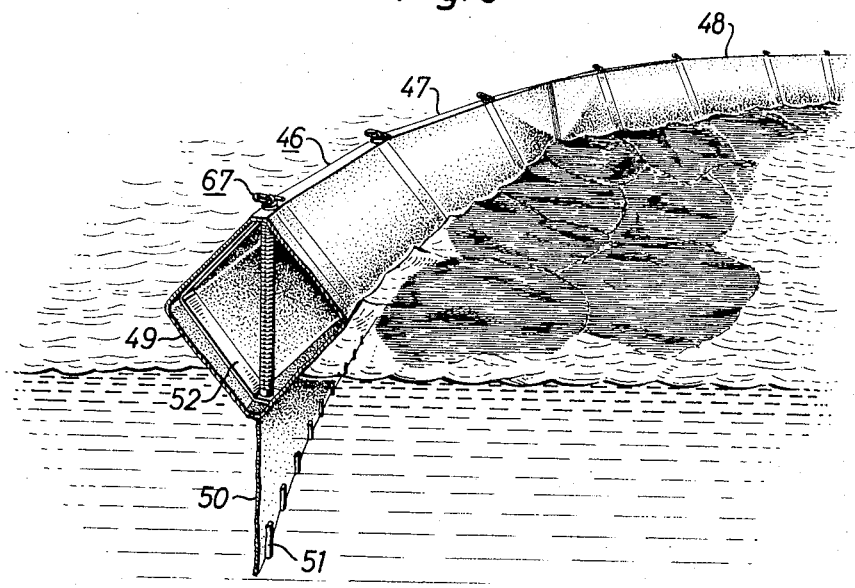
FIG. 8 illustrates in perspective and partially in section a portion of an expanded boom constructed in accordance with a further embodiment of the invention and placed on the surface of the water, the figure also showing the normal position of the boom, on the surface of the water when not subjected to lateral forces as a result of wind or wave pressure.

The tendency of the buoyant bodies used with the above described type of booms to yield to wind and wave pressure is primarily due to the construction of the expander means. When the walls of the boom are subjected to natural forces of sufficiently high magnitude, the expander means (the spring 41) yields to said forces and the buoyant body is compressed. FIGS. 8-11 illustrate an embodiment which enables the buoyant bodies to extend automatically to maximum volume and to be locked in this condition by a special device which can only be released by manual activation when the booms are being rolled-up or folded after use. In FIG. 8 the reference numeral 46 indicates generally a boom consist-ing of a number of sections joined end to end, two sections 47 and 48 being shown. As previously described, each section 47, 48 includes a buoyant body 49 and a curtain 50 having attached at the bottom thereof weights 51.

Figure 9:
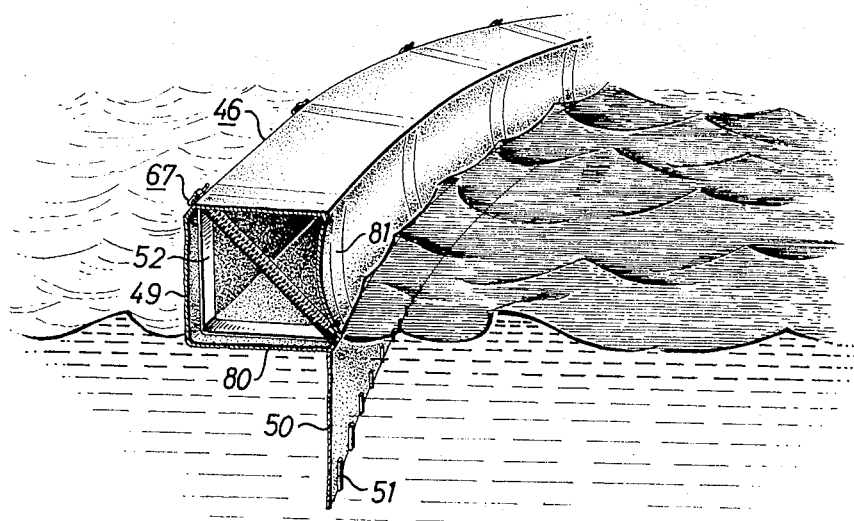
FIG. 9 illustrates the portion of the boom shown in FIG. 8 when the boom is subjected to lateral forces resulting from wind or wave pressure.

Arranged within each section 47, 48 in the manner aforedescribed are expander means 52 according to the invention. FIG. 8 illustrates how the boom behaves in quiet weather, while FIG. 9 illustrates how in rough weather the boom is liable to tilt and lie on one side thereof, while at the same time another side of the boom is pushed inwards by wind and wave pressure. The thus occuring forces attempt to compress the hose, and the expander means 52 must be so arranged that compression of the hose is prevented. At the same time, however, it must be possible to eliminate the effect which counteracts the compression of the boom in a simple manner, so that the boom can be easily rolled up, as illustrated in FIG. 10.

FIGS. 11-15 illustrate an embodiment of the expander means 52 according to the invention, having a frame generally indicated at 53, consisting of two frame pieces 54 and 55, a tension spring 56 and two spring attachments 57, 58. The frame pieces 54, 55 and the spring attachments 57, 58 are suitably manufactured of a plastics material which enables them to be assembled together by heat welding. The spring attachments 57, 58 are provided with flanges 59, 60 (of which only the flange 59 is illustrated in FIG. 11) and end portions 61, 62 on the frame pieces 54, 55 engage the flanges in a fixed joint produced by heat welding for example.

The frame pieces 54, 55 may comprise plastic plates of suitable width and thickness. To provide for the necessary pivot points, the frame pieces are provided at the end portions 61, 62 thereof and substantially in the centre thereof with thickness-reducing recesses 63, which at these positions reduce the resistance of the frame pieces to bending so that hinge-like folding portions having a certain degree of resiliency are obtained.

The frame pieces 54, 55 are subjected to lateral bending forces both when compressed and when expanded and must therefore be sufficiently rigid. This rigidity can be provided for by appropriate dimensioning of the frame pieces 54, 55. It is, however, also possible to use as starting material a relatively thin bar 64, (FIG. 12) which on substantially straight portions of the frame pieces 54, 55 is provided with beads 65 to strengthen the same against bending moments. No special recesses 63, (FIG. 11) need then be provided, but that the thin bar 64 functions at the portion 66 and adjacent the end portions 61, 62 as a hinge means.

The expander means 52 according to the invention is provided with a latching means, generally indicated at 67 in FIG. 11, which prevents the expander means, and thereby also the boom 46, from being pressed together as a result of lateral wind and wave pressure forces. In the embodiment illustrated in FIGS. 11, 13, 14 and 15 the latching means 67 includes a stiff wire 68 arranged within the tension spring 66 and provided at the bottom end with a bent portion 69 and at the other end with an eye piece 70, FIG. 13. The bent portion 69 is grouted in a plastic end piece 71, FIG. 13, the diameter of which is so adjusted with respect to an opening 72 in the spring seating 58 that a light press fit is obtained. To assist in retaining the end piece 71 in position in the spring seating 58, the end piece 71 is provided with a rivet-like head 73 and a circumferential gripping edge 74, which effectively locks the end piece securely in the spring seating 58.

Arranged in the eye member 70 is a latching piece 75, which in the embodiment of FIGS. 11, 13, 14 and 15 consist of a wire folded to form an elongated, narrow eye member having a link portion 76 which passes through the guide eye 70, and an outwardly projecting portion 77 which is slightly shorter than the elongated, narrow eye portion of the latching member 75. The fit between the eye 70 and the link portion 76 is very light, so that an easily movable link connection is obtained between the latching piece 75 and the wire 68.

When the frame is compressed, so that the frame pieces 54, 55 are substantially parallel, the tension spring 56 is fully extended. The latching means 67 then occupies the position in the tension spring 56 illustrated in FIG. 13. The latching member 75 is dimensioned to enable it to slide easily within the tension spring 56 and through an opening 78 arranged coaxially in the spring attachment 57. When the boom is laid out on the surface of the water, the expander means are released from the lateral forces to which they are subjected in the rolled condition of the boom and the tension spring 56, via the spring attachment 57, 58, draws the end portion 61, 62 towards each other so that the frame pieces 54, 55 take the position illustrated in FIG. 11. The latent tension forces in the frame pieces 54, 55 also act in the same direction, these forces occuring when bending along the recesses 63.

Simultaneously as the expander means 52 takes a quadratic or rhomboidal shape due to the actuation of the tension spring 56, as illustrated in FIG. 11, the latching member 75 passes through the opening 78 in the spring attachment 57 and protrudes out to such an extent that the outwardly projecting portion 77 is completely free from the wall of the opening 78. As a result of the easily movable connection between the latching member 75 and the wire 68 and the top-weight of the eye-shaped portion of the latching member, the latching member 75 automatically falls down into the latching position illustrated in FIG. 14. FIG. 14 also illustrates with dashed lines the actual release position of the latching member 75. The force of the tension spring 56 and the length of the wire 68 are so adjusted that subsequent to the spring being fully expanded, a distance $S_3$ is obtained, FIG. 14, which permits the latching member 75 to fall freely on either side.

If the boom 46 is subjected to lateral forces of such magnitude that the tension forces exerted by the spring 56 are overcome, the frame pieces 54, 55 are pressed together. This causes the wire 68 to be drawn down through the opening 78 so that when the distance S becomes zero and the latching member 78 abuts the spring seating 57 in a latching position as illustrated in FIG. 15.

Latching of the expander means 52 is thus effected fully automatically and the latching member 67 can only be released by manual activation. This is done when the boom is rolled up after use, all latching members 75 being successively adjusted as the boom is rolled up so that the outwardly projecting portion 77 extends into the tension spring 56, whereupon the latching member takes the position illustrated in FIG. 13.

When the boom is expanded or compressed it is important that satisfactory communication with the atmosphere is provided. As previously mentioned, the expander means 52 are secured within the boom 46. Hence, arranged on the upper side of the wall of the boom at each attachment point is an opening 79, FIG. 13, the diameter of which substantially corresponds with the outer diameter of the spring attachment 57. The joint between the edge portion adjacent the opening 79 and the flange 59 on the spring attachment 57 is made by heat sealing or adhesion in a manner whereby a durable and tight joint is obtained. The frame pieces 54, 55, as an alternative to the previously described method of attachment, can be connected to the walls of the boom in a corresponding manner. Since the remainder of the boom is fully closed, the hole 78 will form a communication opening between the outer air and the interior of the boom. The hole 78 can be made sufficiently large to provide satisfactory communication and, at the same time, may be sufficiently small to prevent appreciable penetration of water into the buoyant bodies. To provide for very rapid expansion, it may be necessary in practice to provide separate air inlet valves in the boom.

The joint between the lower spring attachment 58 and the lower wall of the boom may substantially be the same as that described with reference to the spring attachment 57.

A boom can be subjected to high stresses and strains from wind, salt water, cold etc. It is therefore obvious that the choice of materials must be made carefully. The plastic portions should not be brittle at low temperatures and all metal components, for example the tension spring 56, the wire 68 and the latching member 75 must be made of a corrosion resistant material.

It can be mentioned in addition to the aforegoing with respect to the function of a boom according to the invention that with comprehensive decontamination operations a larger or smaller number of booms must be connected to form a train of booms which is towed at the two outer ends over the area to be decontaminated, whereby it is often necessary to join the two ends of the boom chain to fully enclose the contaminating oil or the like. In such cases it is suitable to fold the booms together in zig-zag form in bundles, in a manner whereby the two ends of the boom are accessible and capable of being connected to adjacent booms before the booms are laid out on the water, so that the operation of laying out the booms can be carried out continuously.

As previously mentioned, it is important in rough weather that the buoyant bodies of the boom are not compress-ed. This is effectively prevented by means of the latching means according to the invention.

The quadratic or rhomboidal shape of the boom 46 in the expanded position is advantageous with respect to the expansion of the boom but also affords a significant extra effect with regard to the ability of the boom to held oil or other impurities of the water surface enclosed. This extra effect is illustrated in FIG. 9, which shows how a boom has been capsized by wind and wave pressure and/or while being towed and lies on a substantially flat side 80. An adjacent side 81 is subjected in this position to the pressure from wind and waves and becomes somewhat arched as illustrated in the Figure and, together with the curtain 50 forms a screening wall which prevents the impurities and the water driven against the wall 81 from breaking over the same.

It will be understood that the frame pieces 54, 55, of the expander means 57 and the latching means 67 are not restricted to the described embodiment but can have any appropriate construction. Moreover, the invention is not restricted to the described construction of the cavities formed in the boom but that the cavities can be formed in any manner appropriate to the buoyancy of the boom.

The aforedescribed boom can be laid out rapidly, is automatically expanded and can be connected simply and effectively to form long boom chains which positively enclose oil or other impurities floating on the surface of the water. The manufacturing method of the present invention provides a simple, expedient and inexpensive method of manufacturing the boom according to the invention. The described expander means effectively prevents the boom from being compressed as a result of wind and wave pressure and, at the same time, enables the boom to be rolled up or folded together simply and rapidly to a small volume for packaging or storing in a position of readiness. In accordance with the invention there may be such embodiments at which the expanding means are to be actuated manually in order to obtain the expansion of the buoyant bodies before putting the boom into the water and in such a case locked in an expanding position.

What is claimed is:

1. A boom adapted for use in a body of water, comprising collapsible wall means including opposed wall portions defining, when in an expanded state, a plurality of buoyant tubular body portions arranged in series along the length of the boom, each body portion defining therein at least one closed compartment, mechanical expansion means within each of said compartments, said expansion means being movable from a collapsed storage position to an open expanded position wherein said expansion means supports the wall portions of the closed compartment in the expanded state, resilient means operatively interconnected to said expansion means for automatically moving the expansion means from the collapsed position to the opened position for expanding the body portions to said expanded state to make the boom buoyant when released from a substantially flat storage state, said tubular body portions when in said expanded state being positioned so that they project upwardly above the surface of said body of water to an extent sufficient to contain floating impurities, and means defining at least one air passage into each compartment but preventing the entry of water into said compartment, said air passage means providing communication between the atmosphere and the interior of each compartment at least during expansion of said expansion means for permitting the compartments to be filled with air upon expansion of said tubular body portions from said flat storage state to said expanded state.

2. A boom according to claim 1, wherein said resilient means includes a spring disposed within each compartment for effecting the automatic expansion of said expansion means.

3. A boom according to claim 2, wherein the expansion means comprises flexible support means within the compartment and said spring being connected at its ends to the support means and tending to flex the support means outwardly against the wall of the compartment for automatically expanding the compartment.

4. A boom according to claim 3, wherein the support means comprises a pair of flexible strips each connected at opposite ends thereof to the opposite ends of the spring.

5. A boom according to claim 3, wherein the support means comprises a frame structure having sides connected together in end-to-end relationship, the spring urging the frame structure from a collapsed position to an opened position in which the frame structure supports the compartment in an expanded condition, and latch means operable to retain the frame structure releasably in its opened condition.

6. A boom according to claim 5, wherein the sides of the frame structure are connected at their ends by flexible portions having less resistance to bending than the sides to allow the frame structure to be brought into its opened and collapsed positions, and wherein the spring extends diagonally of the frame structure.

7. A boom according to claim 6, wherein the spring comprises a helical tension spring connected at one end thereof to the frame structure by a spring attachment having an opening through which one end of an elongate retainer projects from one end of the spring when the frame structure is in its opened position, the latch means comprising a latch member on said one end of said retainer, the other end of the retainer being anchored to the other end of the spring, and the latch member being pivotable relative to the retainer for locking the frame structure in its opened condition.

8. A boom according to claim 6, wherein the length and spring rate of the spring are so related to the flexible portions that the frame structure tend to assume an equilibrium position in which the frame structure has a substantially quadratic shape.

9. A boom according to claim 1, wherein said body portion has a substantially rectangular cross-section when said body portion is in said expanded state.

10. A boom according to claim 9, further including a sheetlike curtain fixedly secured to said wall means and extending longitudinally thereof, said curtain being adapted to freely suspend downwardly from said wall means when same is disposed in the water, said sheetlike curtain being fixedly secured to said wall means adjacent one of the corners of said rectangular shape.

11. A boom according to claim 1, wherein said elongated tubular buoyant body portion has internal partitions dividing same into a plurality of said compartments disposed in series along the length of said boom, and a sheetlike curtain fixedly secured to said wall means and extending longitudinally thereof, said curtain having one edge thereof secured to said wall means and the other edge thereof being free so that said curtain will freely hang downwardly from said wall means when same is in said expanded state and is disposed in the water.

* * * * *